Aug. 17, 1948.  F. H. DAVIS ET AL  2,447,167
REVERSE BRAKE
Filed June 11, 1945
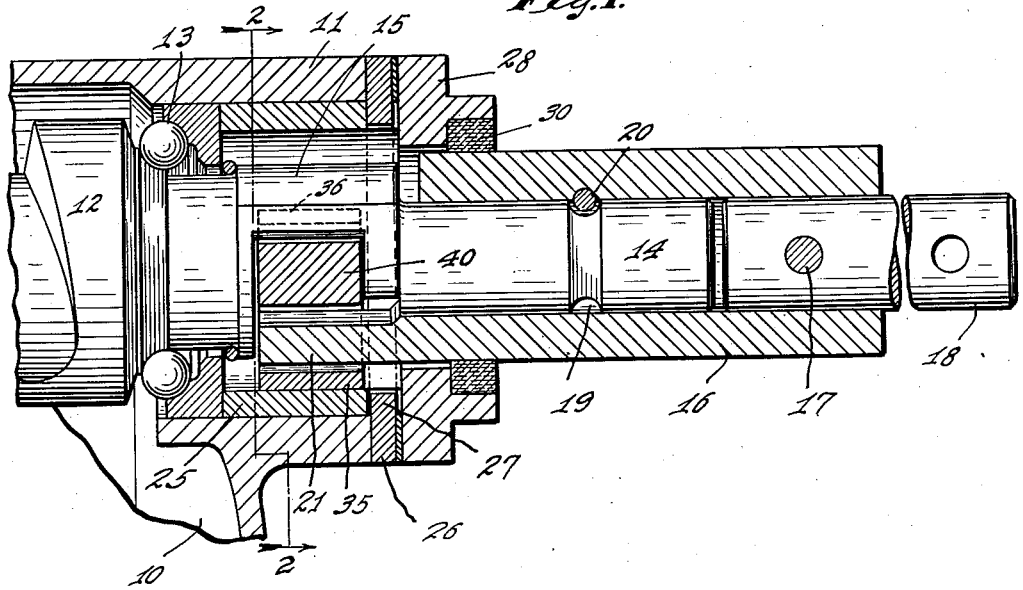
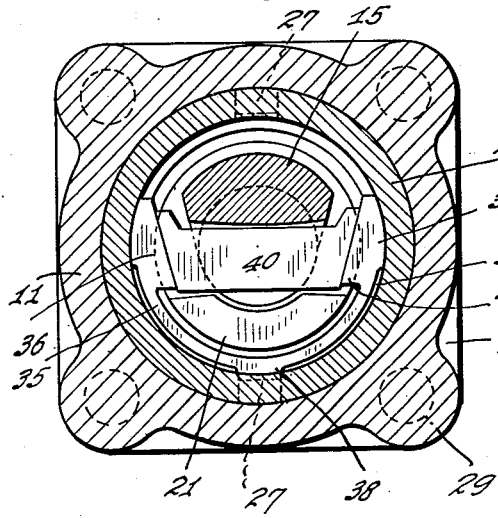
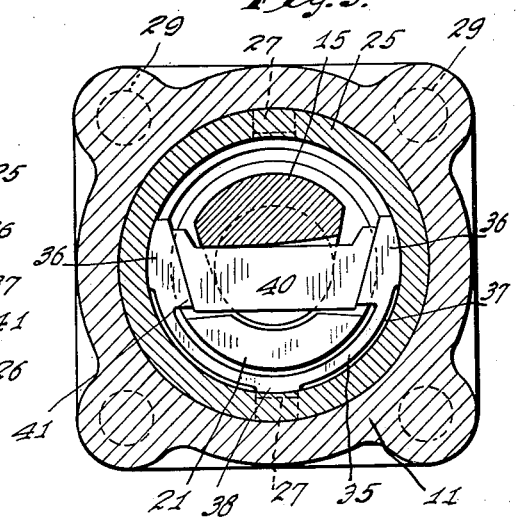
INVENTORS
FRANCIS H. DAVIS
OVID C. EMERSON and
BY PERCY A. NEWMAN,
ATTORNEYS.

Patented Aug. 17, 1948

2,447,167

UNITED STATES PATENT OFFICE 2,447,167

REVERSE BRAKE

Francis H. Davis, Ovid C. Emerson, and Percy A. Newman, La Fayette, Ind., assignors to Ross Gear & Tool Company, La Fayette, Ind., a corporation of Indiana Application June 11, 1945, Serial No. 598,750

3 Claims. (Cl. 192—8)

Our invention is concerned with a reverse brake for use in association with coaxial driving and driven members to prevent rotation of said two members under the influence of a torque applied to the driven member while permitting their free rotation when a torque is applied to the driving member. It is the object of our invention to produce a reverse brake which can be simply and economically manufactured and which will be adaptable for use in a wide variety of situations. A further object of our invention is to provide a reverse brake which while effective for its intended purpose in preventing rotation under the influence of a torque applied to the driven member will not seize and may be quickly released when a torque is applied to the driving member.

In carrying out our invention we provide the driving and driven members with axially overlapping, opposed elements disposed in a stationary sleeve. Within this sleeve we provide an arcuate brake member having at its ends shoes adapted to bear frictionally against the inner surface of the sleeve. The inner faces of such shoes are inclined relative to each other to co-operate with a wedge member which extends generally diametrically of the sleeve and is loosely received between the two opposed elements. Those faces of the two elements which are presented toward the wedge are so shaped that rotation of the driven member in either direction will move the wedge perpendicularly of itself to expand the brake member while rotation of the driving member will move the wedge in the opposite direction to permit the brake member to contract.

The accompanying drawings illustrate our invention: Fig. 1 is an axial section through a reverse brake embodying our invention; Fig. 2 is a transverse section on the line 2—2 of Fig. 1 showing the parts of the brake in their neutral positions; and Fig. 3 is a view similar to Fig. 2 illustrating the positions of the parts when the brake is locked.

The device illustrated in the drawing embodies a housing 10 provided with an extension 11 coaxial with a driven member in the form of a helical cam 12. The cam 12 is rotatably supported in the housing 10 through the medium of suitable bearings including the anti-friction bearing 13 and is provided with a coaxial pilot 14 rigidly connected with the cam through the medium of an eccentric bridge 15. The pilot 14 is rotatably received in a sleeve 16 which is rigidly connected, as by means of a transverse pin 17, with a manually operable driving shaft 18. To prevent relative axial movement of the sleeve 16 and pilot 14 while permitting their relative rotation, the latter may be provided with an annular groove 19 for the receipt of an eccentric pin 20 in the sleeve. The sleeve 16 is provided with an extension 21 which projects into axially overlapping relation with the bridge 15 and is spaced therefrom.

Within the housing-extension 11 we provide a sleeve 25, preferably hardened and ground. The sleeve 25 is prevented from rotating in the housing by means of a plate 26 which is disposed over the end of the housing-extension 11 and provided with two inwardly projecting ears 27 received in notches in the sleeve. A cap 28 overlies the plate 26; and the cap and plate are held in position by screws (not shown) which pass through them into holes 29 in the extension 11. A lubricant sealing ring 30 is desirably provided between the cap 28 and the sleeve 16.

Within the sleeve 25 and in the plane of the overlapping bridge 15 and extension 21 there is a brake member 35. Such brake member is arcuate in shape, desirably of somewhat more than 180° in total circumferential extent, and is provided at its ends with shoes 36 the exterior surfaces of which conform in curvature to the inner surface of the sleeve 25. Desirably, the outer surface of the brake member 35 is relieved, as indicated at 37, between the shoes 36 and a third or intermediate shoe 38 adapted to bear against the inner surface of the sleeve.

The inner surfaces of the shoes 36 are inclined with respect to each other, converging toward the extension 21; and between them there is located a wedge member 40 whose end faces are tapered complementarily to the inner faces of the shoes 36. The wedge member extends generally diametrically of the sleeve 25 between the bridge 15 and the extension 21, and is somewhat narrower than the space between the extension and bridge, as will be clear from Figs. 2 and 3. Those faces of the bridge 15 and extension 21 which are presented toward the wedge are so shaped that upon rotation relative to the wedge they will engage it between its ends and its middle.

If desired, those ends of the shoes 36 adjacent the extension 21 may be provided with shoulders 41 positioned to be engaged respectively by the ends of the extension 21 as the latter rotates.

The parts of the device are illustrated in their neutral positions in Fig. 2. From this figure, it will be clear that either the bridge 15 or the extension 21 can rotate to a limited extent while the other of such elements remains stationary, If the bridge 15 is rotated by a torque transmitted to it through the cam 12 it will engage the wedge 40, as indicated in Fig. 3, and force it downwardly causing it to urge the shoes 36 outwardly into firm gripping engagement with the inner surface of the sleeve 25. The lost-motion between the bridge 15 and the extension 21 permits this gripping engagement to occur before the wedge engages the extension 21 to transmit torque to the sleeve 16 and shaft 18. Irrespective of the direction in which the bridge 16 rotates from its neutral position shown in Fig. 2 it will engage the wedge 40 and cause it to expand the brake member and prevent further rotation. If, on the other hand, the shaft 18 is rotated by the operator, one end of the extension 21 will engage the wedge and lift it upwardly, thus relieving any expanding effort previously exerted by the wedge on the brake member. As rotation of the shaft 18 is continued, torque will be transmitted from the extension 21 through the wedge 40 to the bridge 15, and thereafter the cam 12 will be rotated with the shaft 18. In this rotation the action of the wedge 40 on the brake member will cause it to rotate with the driving shaft 18 and cam 12; but should the wedge fail to drive the brake member in this rotation, one of the shoulders 41 will be engaged by the adjacent end of the extension 21 to cause the brake member to be rotated positively.

We claim as our invention:

1. In combination, a stationary member having a circular bore, rotatable driving and driven members coaxial with said bore, said driving and driven members being provided with axially overlapping extensions arranged in opposed relationship within said bore, an arcuate brake member disposed in said bore, an actuator disposed between the ends of said brake member, said actuator being located between said extensions and providing a lost-motion connection between them, said actuator having end faces converging toward each other away from the extension on said driven member, said brake member being provided interiorly with faces complementary to and respectively engaged by the end faces of said actuator and also with shoulders engageable by one of said extensions to limit the extent to which such extension can rotate relatively to the brake member.

2. In combination, a stationary member having a central bore, rotatable driving and driven members coaxial with said bore, an actuator extending generally diametrically of said bore and having its ends spaced from the bore-surface, an arcuate brake member having end portions disposed respectively between the ends of said actuator and the bore-surface and a resilient intermediate portion interconnecting said end portions, said driving and driven members being provided with extensions disposed respectively on opposite sides of said actuator and spaced therefrom whereby said actuator will provide a lost-motion connection between the extensions, said actuator engaging the end portions of said brake member over surfaces which converge toward each other away from the extension on said driven member and which are disposed adjacent opposite ends of a diameter of said bore.

3. In combination, a stationary member having a central bore, an arcuate brake member disposed in said bore, and an actuator having a portion disposed between the ends of said brake member and engaging such brake-member ends over converging surfaces, said driven member being provided with an abutment extending axially into overlapping relation with said actuator and engageable therewith upon rotation of the driven member to move said actuator radially in the direction in which said surfaces converge, said driving member being provided with an abutment extending axially into overlapping relation with said actuator and engageable therewith upon rotation of the driving member to move said actuator radially in the opposite direction, the points at which the abutment on said driven member engages said actuator being located between the planes of said converging surfaces.

FRANCIS H. DAVIS.
OVID C. EMERSON.
PERCY A. NEWMAN.

REFERENCES CITED

The following references are of record in the file of this patent:

UNITED STATES PATENTS

| Number | Name | Date |
|---|---|---|
| 998,852 | Lagergren | July 25, 1911 |
| 1,575,038 | Clas | Mar. 2, 1926 |
| 1,810,851 | Petit | June 16, 1931 |
| 2,051,400 | Taylor | Aug. 18, 1936 |

FOREIGN PATENTS

| Number | Country | Date |
|---|---|---|
| 5,821 | Great Britain | May 8, 1913 |